United States Patent
Sheehan et al.

(10) Patent No.: US 12,474,600 B2
(45) Date of Patent: Nov. 18, 2025

(54) SLEEP-AIDING EYEWEAR WITH IMPROVED VISIBILITY

(71) Applicant: Dreamers Holdings, Inc., Brooklyn, NY (US)

(72) Inventors: Stafford W. Sheehan, Tiverton, RI (US); Zachary R. Stenmark, Sydney (AU); Jordan D. Stenmark, Sydney (AU)

(73) Assignee: Dreamers Holdings, Inc., Brooklyn, NY (US)

(*) Notice: Subject to any disclaimer, the term of this patent is extended or adjusted under 35 U.S.C. 154(b) by 816 days.

(21) Appl. No.: 17/775,950

(22) PCT Filed: Nov. 10, 2020

(86) PCT No.: PCT/US2020/059804
§ 371 (c)(1),
(2) Date: May 11, 2022

(87) PCT Pub. No.: WO2021/096840
PCT Pub. Date: May 20, 2021

(65) Prior Publication Data
US 2022/0390769 A1    Dec. 8, 2022

Related U.S. Application Data

(60) Provisional application No. 63/104,906, filed on Oct. 23, 2020, provisional application No. 62/933,521, filed on Nov. 11, 2019.

(51) Int. Cl.
*G02C 7/10* (2006.01)
*A61F 9/02* (2006.01)
*G02B 1/02* (2006.01)

(52) U.S. Cl.
CPC .............. *G02C 7/104* (2013.01); *A61F 9/022* (2013.01); *G02B 1/02* (2013.01)

(58) Field of Classification Search
CPC ........... G02C 7/104; A61F 9/022; G02B 1/02; G02B 5/285; G02B 1/10; G02B 5/289
See application file for complete search history.

(56) References Cited

U.S. PATENT DOCUMENTS 10,126,587 B2    11/2018    Chung
2015/0338683 A1  11/2015    Perricone et al.
(Continued)

FOREIGN PATENT DOCUMENTS

CN    203444130 U    2/2014
CN    104903760 B    10/2017
(Continued)

OTHER PUBLICATIONS

International Search Report and Written Opinion for International Application No. PCT/US2020/059804 dated Feb. 12, 2021.

*Primary Examiner* — James C. Jones
(74) *Attorney, Agent, or Firm* — Foley Hoag LLP; Janine S. Ladislaw; Laura A. Wzorek

(57) ABSTRACT

Sleep-aiding eyewear that prevents light which inhibits melatonin production from reaching the eye is described. The eyewear that is the object of the present disclosure has improved visibility over other methods of cutting off melatonin-inhibiting wavelengths of light, which enables the user to perform tasks, such as reading and typing, uninhibited. This is achieved in some embodiments using a Bragg grating comprising multiple layers of alternating reflective index material as a surface coating on the lens. This may be combined with lens-tinting, or antireflective coatings, in the eyewear. Furthermore, transition lenses which block melatonin-shifting light when there is a suitable external stimulus, such as blue light from a light emitting diode, are (Continued)

described. The presently described filters are also useful for electronic displays and functional light-transmitting materials.

20 Claims, 12 Drawing Sheets

(56) References Cited

U.S. PATENT DOCUMENTS

| | | | |
|---|---|---|---|
| 2018/0321515 A1* | 11/2018 | Cheng | G02C 7/104 |
| 2019/0172988 A1 | 6/2019 | Nimura et al. | |
| 2019/0258086 A1 | 8/2019 | Barrau et al. | |

FOREIGN PATENT DOCUMENTS

| | | |
|---|---|---|
| CN | 105593712 B | 8/2018 |
| CN | 109357172 A | 2/2019 |
| EP | 3457196 A1 | 3/2019 |
| JP | 6277576 B2 | 2/2018 |
| TW | I225227 B | 12/2004 |
| WO | WO-2021/096840 A1 | 5/2021 |

* cited by examiner

SLEEP-AIDING EYEWEAR WITH IMPROVED VISIBILITY

RELATED APPLICATIONS

This application is a U.S. National Stage Application of International Application No. PCT/US2020/059804, filed Nov. 10, 2020; which claims the benefit of priority to U.S. Provisional Patent Application No. 62/933,521, filed Nov. 11, 2019, and U.S. Provisional Patent Application No. 63/104,906, filed Oct. 23, 2020, each of which is hereby incorporated by reference in its entirety.

BACKGROUND

The effect of light on a person's circadian rhythm and ability to sleep has been evident throughout history. Put simply, it is typically easier to fall asleep without the presence of light due to human beings being diurnal. In recent years, increased sources of artificial light throughout the nighttime has been shown to have a negative effect on one's ability to sleep. This effect was first shown quantitatively in 1980 by Alfred Lewy et al (Science, 1980, vol. 210, pgs. 1267-1269), who demonstrated that bright artificial light substantially suppresses the production of melatonin, the hormone that the body produces to promote sleep, in humans. Lewy and coworkers used blood samples from both male and female test subjects to show that this effect was seen broadly among human test subjects, similarly to other mammals.

Since the initial demonstration of melatonin suppression in humans by artificial light, the type of light that has a quantitative effect on circadian rhythm and melatonin production has been studied extensively. In 1984, George Brainard et al (Brain Research, 1984, vol. 294, pgs. 333-339) showed that the melatonin suppression effects of artificial light are strongly wavelength-dependent in hamsters. Specifically, blue and green light (from about 435-550 nm) suppressed melatonin production more strongly than other wavelengths in the ultraviolet-visible spectrum. One year later, the same group demonstrated that this wavelength-dependence of melatonin production suppression is also shared in humans (Ann. New York Acad. Sci., 1985, vol. 453, pgs. 376-378).

Since then, researchers have been investigating methods to better control sleep and circadian rhythm by controlling the wavelength of light that reaches the eye depending on the time of day and when sleep is desired. Several devices exist that attempt to achieve this desired effect. These devices all involve devices, such as glasses, googles, or other eyewear that block the specific wavelengths of light that suppress melatonin production around the times that a user would like to fall asleep. Nevertheless, these devices negatively affect the user's ability to see and perform tasks when using these devices, due to the low optical quality of these coatings and prevention of broadband light transmission across several wavelengths. Accordingly, there is a need to provide a device that selectively blocks the wavelengths of light that have the most negative impact on human circadian rhythm and melatonin production in a non-invasive manner, while transmitting as much unperturbed light that does not affect sleep as possible, so that the user can still read and perform other tasks while wearing the device.

BRIEF SUMMARY

The presently disclosure provides in certain aspects optical filters for reducing the amount of melatonin-inhibiting light transmitted to an eye of a subject, wherein the filter reflects at least 50% of light with a wavelength below about 560 nm, and transmits at least 50% of light with a wavelength above about 570 nm. In certain embodiments, the filter reflects at least 80% of light with a wavelength below about 560 nm, and transmits at least 80% of light with a wavelength above about 570 nm. In other embodiments, the filter reflects substantially all light with a wavelength below about 560 nm, and transmits substantially all light with a wavelength above about 570 nm.

Other aspects of the disclosure provide an optical filter for reducing the amount of melatonin-inhibiting light transmitted to an eye of a subject, wherein the filter reflects at least 50% of light with a wavelength below about 495 nm, and transmits at least 50% of light with a wavelength above about 505 nm. In some embodiments, the filter reflects at least 80% of light with a wavelength below about 495 nm, and transmits at least 80% of light with a wavelength above about 505 nm. In other embodiments, the filter reflects substantially all light with a wavelength below about 495 nm, and transmits substantially all light with a wavelength above about 505 nm.

Other aspects of the disclosure provide an optical filter for reducing the amount of melatonin-inhibiting light transmitted to an eye of a subject, wherein the filter reflects at least 50% of light with a wavelength below about 480 nm, and transmits at least 50% of light with a wavelength above about 505 nm. In other embodiments, the filter reflects at least 80% of light with a wavelength below about 480 nm, and transmits at least 80% of light with a wavelength above about 505 nm. In another embodiment, the filter reflects substantially all light with a wavelength below about 480 nm, and transmits substantially all light with a wavelength above about 505 nm.

In certain embodiments, the filter comprises a Bragg grating. In some embodiments, the filter comprises a Bragg grating. In certain embodiments, the Bragg grating comprises alternating layers of a first material having a first index of refraction and a second material having a second index of refraction, wherein the first index of refraction is higher than the second index of refraction.

In certain embodiments, the first material is selected from $TiO_2$, $Ti_3O_5$, $TiO_x$, $Al_2O_3$, $AlO_x$, C (diamond), SiC, $SrTiO_3$, $Ta_2O_5$, $ZrO_2$, ZnS, ZnO, and any combination thereof. In come embodiments, the first material is $TiO_2$. In certain embodiments, the second material is selected from $SiO_2$, SiO, $MgF_2$, $In_2O_3$, ITO (Sn-doped $In_2O_3$), polymers such as polymethyl methacrylate (PMMA), and any combination thereof. In some embodiments, the second material is $SiO_2$.

In certain embodiments, the first material and/or second material is doped with one or more photochromic elements. In certain embodiments, the photochromic element is selected from Ag, Cl, Br, Cu, Mo, W, V, Nb, Ti, Ln, Ce, Pr, Nd, Sm, Eu, Gd, Tb, Dy, Ho, Er, Tm, Yb, Lu, and any combination thereof.

In certain embodiments, the Bragg grating comprises at least 20 layers. In certain embodiments, the Bragg grating comprises at least 30 layers.

In other aspects, provided herein are lenses for reducing the amount of melatonin-inhibiting light transmitted to an eye of a subject, the lens comprising:

a) a substrate, said substrate having an outer and inner surface;

b) an optical filter of the present disclosure, the filter having an outer and inner surface; and c) a coating, the coating having an outer and inner surface.

In certain embodiments, the substrate is of a sufficient size to afford coverage of the eye such that it does not allow substantial light to shine on the eye. In certain embodiments, the coating is selected from an antireflective coating or a tint. In certain embodiments, the coating comprises an antireflective coating and a tint. In certain embodiments, the coating reduces the reflectance of the filter.

In certain embodiments, the substrate is selected from polycarbonate, polyurethane, and copolymers thereof, allyl diglycol carbonate (CR-39), urethanes enriched with nitrogen or sulfur (Trivex), glass, and any combination thereof. In preferred embodiments, the substrate comprises polycarbonate.

In certain embodiments, the inner surface of the filter is disposed along the outer surface of the substrate, and the coating is disposed along the outer surface of the filter. In certain such embodiments, the coating is a hydrophobic coating. In certain embodiments, the coating is disposed along the outer surface of the substrate, and the inner surface of the filter is disposed along the outer surface of the coating. In certain such embodiments, the coating is a hard coating. In certain embodiments, the hard coating comprises a $SiO_2$-polyethylene oxide or $SiO_2$-polyethylene oxide-polymethyl methacrylate.

In particular aspects, provided herein are devices comprising:
a frame;
at least one lens of the present disclosure disposed within the frame;
a first arm hingedly coupled to the frame at a first end; and
a second arm hingedly coupled to the frame at a second end.

In further aspects, provided herein are methods of making the disclosed filters, comprising the steps of:
(a) contacting one or more pellets of the first material with an electron beam under vacuum to evaporate particles of the first material;
(b) contacting one or more pellets of the second material with an electron beam under vacuum to evaporate particles of the second material; and
(c) depositing the particles of the first material and the particles of the second material onto a substrate, thereby forming the optical filter;
wherein steps (a) and (b) occur sequentially.

In certain aspects, provided herein are methods of making the disclosed lenses, comprising the steps of:
(a) contacting one or more pellets of the first material with an electron beam under vacuum to evaporate particles of the first material;
(b) contacting one or more pellets of the second material with an electron beam under vacuum to evaporate particles of the second material; and
(c) depositing the particles of the first material and the particles of the second material onto the outer surface of the coating, thereby forming the lens;
wherein steps (a) and (b) occur sequentially.

In additional aspects, provided herein are transition optical filters for reducing the amount of melatonin-inhibiting light transmitted to an eye of a subject, wherein the filters reflect at least 50% of light with a wavelength below about 560 nm, transmit at least 50% of light with a wavelength above about 570 nm, and are activated by low wavelength light with a wavelength between about 466 and about 470 nm. In some embodiments, the transition optical filter reflects at least 80% of light with a wavelength below about 560 nm, and transmits at least 80% of light with a wavelength above about 570 nm. In other embodiments, the filter reflects substantially all light with a wavelength below about 560 nm, and transmits substantially all light with a wavelength above about 570 nm.

Another aspect of the disclosure provides a transition optical filter for reducing the amount of melatonin-inhibiting light transmitted to an eye of a subject, wherein the filter reflects at least 50% of light with a wavelength below about 560 nm, transmits at least 50% of light with a wavelength above about 570 nm, and is activated by low wavelength light with a wavelength between about 466 and about 470 nm. In some, embodiments, the filter reflects at least 80% of light with a wavelength below about 560 nm, and transmits at least 80% of light with a wavelength above about 570 nm. In other embodiments, the filter reflects substantially all light with a wavelength below about 560 nm, and transmits substantially all light with a wavelength above about 570 nm.

Another aspect of the present disclosure provides a transition optical filter for reducing the amount of melatonin-inhibiting light transmitted to an eye of a subject, wherein the filter reflects at least 50% of light with a wavelength below about 495 nm, and transmits at least 50% of light with a wavelength above about 505 nm, and is activated by low wavelength light with a wavelength between about 466 and about 470 nm. In some embodiments, the filter reflects at least 80% of light with a wavelength below about 495 nm, and transmits at least 80% of light with a wavelength above about 505 nm. In other embodiments, the filter reflects substantially all light with a wavelength below about 495 nm, and transmits substantially all light with a wavelength above about 505 nm.

Another aspect of the present disclosure provides a transition optical filter for reducing the amount of melatonin-inhibiting light transmitted to an eye of a subject, wherein the filter reflects at least 50% of light with a wavelength below about 480 nm, and transmits at least 50% of light with a wavelength above about 505 nm, and is activated by low wavelength light with a wavelength between about 466 and about 470 nm. In some embodiments, the filter reflects at least 80% of light with a wavelength below about 480 nm, and transmits at least 80% of light with a wavelength above about 505 nm. In other embodiments, the filter reflects substantially all light with a wavelength below about 480 nm, and transmits substantially all light with a wavelength above about 505 nm.

In some embodiments, the filter comprises a Bragg grating. In certain embodiments, the filter is a Bragg grating. In certain embodiments, the Bragg grating comprises alternating layers of a first material having a first index of refraction and a second material having a second index of refraction, wherein the first index of refraction is higher than the second index of refraction.

In certain embodiments, the first material is selected from $TiO_2$, $Ti_3O_5$, $TiO_x$, $Al_2O_3$, $AlO_x$, C (diamond), SiC, $SrTiO_3$, $Ta_2O_5$, $ZrO_2$, ZnS, ZnO, and any combination thereof. In preferred embodiments, the first material is $TiO_2$. In certain embodiments, the second material is selected from $SiO_2$, SiO, $MgF_2$, $In_2O_3$, ITO (Sn-doped $In_2O_3$), polymers such as polymethyl methacrylate (PMMA), and any combination thereof. In preferred embodiments, the second material is $SiO_2$.

In certain embodiments, the Bragg grating comprises at least 20 layers. In certain embodiments, the Bragg grating comprises at least 30 layers.

In other aspects, provided herein are lenses for reducing the amount of melatonin-inhibiting light transmitted to an eye of a subject, the lens comprising:

a) a substrate, said substrate having an outer and inner surface;
b) the transition optical filter of the present disclosure, the transition optical filter having an outer and inner surface; and
c) a coating, the coating having an outer and inner surface.

In certain embodiments, the substrate is of a sufficient size to afford coverage of the eye such that it does not allow substantial light to shine on the eye. In certain embodiments, the coating is selected from an antireflective coating or a tint. In certain embodiments, the coating comprises an antireflective coating and a tint. In certain embodiments, the coating reduces the reflectance of the filter.

In certain embodiments, the substrate is selected from polycarbonate, polyurethane, and copolymers thereof, allyl diglycol carbonate (CR-39), urethanes enriched with nitrogen or sulfur (Trivex), glass and any combination thereof. In some embodiments, the substrate comprises polycarbonate.

In certain embodiments, the inner surface of the filter is disposed along the outer surface of the substrate, and the coating is disposed along the outer surface of the filter. In certain such embodiments, the coating is a hydrophobic coating. In certain embodiments, the coating is disposed along the outer surface of the substrate, and the inner surface of the filter is disposed along the outer surface of the coating. In certain such embodiments, the coating is a hard coating. In certain embodiments, the hard coating comprises a $SiO_2$-polyethylene oxide or $SiO_2$-polyethylene oxide-polymethyl methacrylate.

In particular aspects, provided herein are devices comprising: a frame;
  at least one lens comprising the transition optical filter of the present disclosure disposed within the frame;
  a first arm hingedly coupled to the frame at a first end; and
  a second arm hingedly coupled to the frame at a second end.

In further aspects of the disclosure, provided herein are methods of making the disclosed filters, comprising the steps of:
  (a) contacting one or more pellets of the first material with an electron beam under vacuum to evaporate particles of the first material;
  (b) contacting one or more pellets of the second material with an electron beam under vacuum to evaporate particles of the second material; and
  (c) depositing the particles of the first material and the particles of the second material onto a substrate, thereby forming the optical filter;
  wherein steps (a) and (b) occur sequentially.

In certain aspects of the disclosure, provided herein are methods of making the disclosed lenses, comprising the steps of:
  (a) contacting one or more pellets of the first material with an electron beam under vacuum to evaporate particles of the first material;
  (b) contacting one or more pellets of the second material with an electron beam under vacuum to evaporate particles of the second material; and
  (c) depositing the particles of the first material and the particles of the second material onto the outer surface of the coating, thereby forming the lens;
  wherein steps (a) and (b) occur sequentially.

In further aspects, the disclosure provides an electronic display comprising an optical filter as described in this application.

In still further aspects, the disclosure provides a functional light-transmitting material comprising an optical filter as described in this application.

BRIEF DESCRIPTION OF THE DRAWINGS

FIG. 6 also depicts the melatonin action spectrum for comparison.

FIG. 7 also depicts the melatonin action spectrum for comparison.

DETAILED DESCRIPTION

Figure 1:
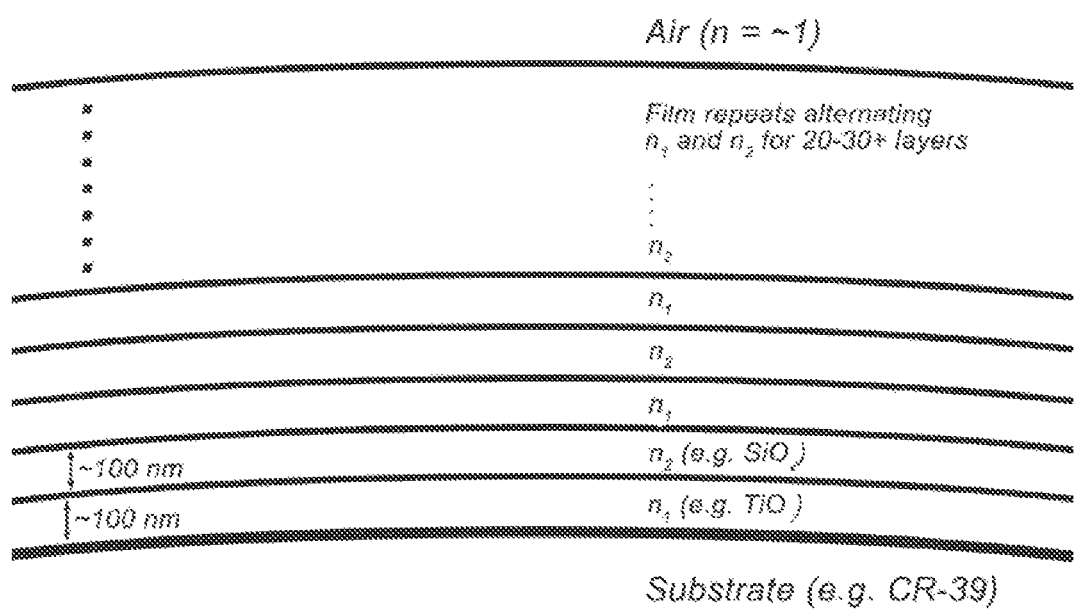
FIG. 1 shows a diagram of an exemplary thin film stack used as the lens coating to prevent transmission of melatonin inhibiting light according to embodiments of the present disclosure.

In some embodiments, the present disclosure relates to wearable devices (such as glasses, goggles and any other eyewear), electronic displays (such as computer monitors, laptop screens, smartphones, televisions, digital watches, and virtual-reality headsets), and functional light-transmitting materials (such as windows, lightbulbs, windshields, sapphire, crystal, and protectors for electronic displays) that filter or block the wavelengths of light inhibitive of sleep while maintaining function, such as visibility for the wearer of the wearable devices. These wavelengths of light may inhibit sleep by several mechanisms, including but not limited to modification of circadian rhythm, inhibition of melatonin production in the brain, stimulation of pain receptors, or other methods. The wearable device, electronic display, and functional material uses a high-quality optical filter to achieve selective blocking of wavelengths of light that have a negative effect on sleep for the user.

The optical filters described herein advantageously cuts off or reduces the wavelengths of light that inhibit sleep, while permitting both longer and shorter wavelengths through so that the wearer can see out the glasses sufficiently to comfortably perform tasks, such as reading. The present disclosure encompasses both the optical filter, which may be a coating on a lens made from a material approved by the US Food and Drug Administration such as polycarbonate, Trivex, or CR-39, as well as the lens itself. In some embodiments, the lens itself functions as an optical filter as described herein. In some cases, the lens possesses a hard coating, comprising a UV-curing polymer resin, between the optical filter coating and the lens material. In some cases, the lens comprises a hydrophobic coating as the outermost coating of the lens, protecting the optical filter coating from environmental wear.

Optical Filters

In certain aspects, provided herein are optical filters for reducing the amount of melatonin-inhibiting light transmitted to an eye of a subject, wherein the filter reflects at least 50% of light with a wavelength below about 560 nm. In certain embodiments, the filter transmits at least 50% of light with a wavelength above about 570 nm. In certain aspects, provided herein are optical filters for reducing the amount of melatonin-inhibiting light transmitted to an eye of a subject, wherein the filter reflects at least 50% of light with a wavelength below about 560 nm, and transmits at least 50% of light with a wavelength above about 570 nm.

In certain aspects, provided herein are optical filters for reducing the amount of melatonin-inhibiting light transmitted to an eye of a subject, wherein the filter reflects at least 50% of light with a wavelength below about 495 nm. In certain embodiments, the filter transmits at least 50% of light with a wavelength above about 505 nm. In certain aspects, provided herein are optical filters for reducing the amount of melatonin-inhibiting light transmitted to an eye of a subject, wherein the filter reflects at least 50% of light with a wavelength below about 495 nm, and transmits at least 50% of light with a wavelength above about 505 nm.

In certain aspects, provided herein are optical filters for reducing the amount of melatonin-inhibiting light transmitted to an eye of a subject, wherein the filter reflects at least 50% of light with a wavelength below about 480 nm. In certain embodiments, the filter transmits at least 50% of light with a wavelength above about 505 nm. In certain aspects, provided herein are optical filters for reducing the amount of melatonin-inhibiting light transmitted to an eye of a subject, wherein the filter reflects at least 50% of light with a wavelength below about 480 nm, and transmits at least 50% of light with a wavelength above about 505 nm.

In certain aspects, provided herein are optical filters for reducing the amount of melatonin-inhibiting light transmitted to an eye of a subject, wherein the filter reflects at least 50% of light with a wavelength below about 480 nm. In certain embodiments, the filter transmits at least 50% of light with a wavelength above about 490 nm. In certain aspects, provided herein are optical filters for reducing the amount of melatonin-inhibiting light transmitted to an eye of a subject, wherein the filter reflects at least 50% of light with a wavelength below about 480 nm, and transmits at least 50% of light with a wavelength above about 490 nm.

In certain aspects, provided herein are optical filters for reducing the amount of melatonin-inhibiting light transmitted to an eye of a subject, wherein the filter reflects about 80% of light with a wavelength below about 560 nm. In certain embodiments, the filter transmits about 80% of light with a wavelength above about 570 nm. In certain aspects, provided herein are optical filters for reducing the amount of melatonin-inhibiting light transmitted to an eye of a subject, wherein the filter reflects about 80% of light with a wavelength below about 560 nm, and transmits about 80% of light with a wavelength above about 570 nm.

In certain aspects, provided herein are optical filters for reducing the amount of melatonin-inhibiting light transmitted to an eye of a subject, wherein the filter reflects about 80% of light with a wavelength below about 495 nm. In certain embodiments, the filter transmits about 80% of light with a wavelength above about 505 nm. In certain aspects, provided herein are optical filters for reducing the amount of melatonin-inhibiting light transmitted to an eye of a subject, wherein the filter reflects about 80% of light with a wavelength below about 495 nm, and transmits about 80% of light with a wavelength above about 505 nm.

In certain aspects, provided herein are optical filters for reducing the amount of melatonin-inhibiting light transmitted to an eye of a subject, wherein the filter reflects about 80% of light with a wavelength below about 480 nm. In certain embodiments, the filter transmits about 80% of light with a wavelength above about 505 nm. In certain aspects, provided herein are optical filters for reducing the amount of melatonin-inhibiting light transmitted to an eye of a subject, wherein the filter reflects about 80% of light with a wavelength below about 480 nm, and transmits about 80% of light with a wavelength above about 505 nm.

In certain aspects, provided herein are optical filters for reducing the amount of melatonin-inhibiting light transmitted to an eye of a subject, wherein the filter reflects about 80% of light with a wavelength below about 480 nm. In certain embodiments, the filter transmits about 80% of light with a wavelength above about 490 nm. In certain aspects, provided herein are optical filters for reducing the amount of melatonin-inhibiting light transmitted to an eye of a subject, wherein the filter reflects about 80% of light with a wavelength below about 480 nm, and transmits about 80% of light with a wavelength above about 490 nm.

In certain embodiments, the filter reflects about 55% of light with a wavelength below about 560 nm, and transmits about 55% of light with a wavelength above about 570 nm. In certain embodiments, the filter reflects about 60% of light with a wavelength below about 560 nm, and transmits about 60% of light with a wavelength above about 570 nm. In certain embodiments, the filter reflects about 65% of light with a wavelength below about 560 nm, and transmits about 65% of light with a wavelength above about 570 nm. In certain embodiments, the filter reflects about 70% of light with a wavelength below about 560 nm, and transmits about 70% of light with a wavelength above about 570 nm. In certain embodiments, the filter reflects about 75% of light with a wavelength below about 560 nm, and transmits about 75% of light with a wavelength above about 570 nm. In certain embodiments, the filter reflects about 85% of light with a wavelength below about 560 nm, and transmits about 85% of light with a wavelength above about 570 nm. In certain embodiments, the filter reflects about 90% of light with a wavelength below about 560 nm, and transmits about 90% of light with a wavelength above about 570 nm. In certain embodiments, the filter reflects about 95% of light with a wavelength below about 560 nm, and transmits about 95% of light with a wavelength above about 570 nm. In preferred embodiments, the filter reflects substantially all light with a wavelength below about 560 nm, and transmits substantially all light with a wavelength above about 570 nm.

As used herein, the term "transmits substantially all light" of a stated wavelength means more than 95%, such as 96%, 97%, 98%, 99% or 100%. Similarly, as used herein, the term "reflects substantially all light" of a stated wavelength means more than 95%, such as 96%, 97%, 98%, 99% or 100%.

In certain embodiments, the filter reflects about 55% of light with a wavelength below about 495 nm, and transmits about 55% of light with a wavelength above about 505 nm. In certain embodiments, the filter reflects about 60% of light with a wavelength below about 495 nm, and transmits about 60% of light with a wavelength above about 505 nm. In certain embodiments, the filter reflects about 65% of light with a wavelength below about 495 nm, and transmits about 65% of light with a wavelength above about 505 nm. In certain embodiments, the filter reflects about 70% of light with a wavelength below about 495 nm, and transmits about 70% of light with a wavelength above about 505 nm. In certain embodiments, the filter reflects about 75% of light with a wavelength below about 495 nm, and transmits about 75% of light with a wavelength above about 505 nm. In certain embodiments, the filter reflects about 85% of light with a wavelength below about 495 nm, and transmits about 85% of light with a wavelength above about 505 nm. In certain embodiments, the filter reflects about 90% of light with a wavelength below about 495 nm, and transmits about 90% of light with a wavelength above about 505 nm. In certain embodiments, the filter reflects about 95% of light with a wavelength below about 495 nm, and transmits about 95% of light with a wavelength above about 505 nm. In preferred embodiments, the filter reflects substantially all light with a wavelength below about 495 nm, and transmits substantially all light with a wavelength above about 505 nm.

In certain embodiments, the filter reflects about 55% of light with a wavelength below about 480 nm, and transmits about 55% of light with a wavelength above about 505 nm. In certain embodiments, the filter reflects about 60% of light with a wavelength below about 480 nm, and transmits about 60% of light with a wavelength above about 505 nm. In certain embodiments, the filter reflects about 65% of light with a wavelength below about 480 nm, and transmits about 65% of light with a wavelength above about 505 nm. In certain embodiments, the filter reflects about 70% of light with a wavelength below about 480 nm, and transmits about 70% of light with a wavelength above about 505 nm. In certain embodiments, the filter reflects about 75% of light with a wavelength below about 480 nm, and transmits about 75% of light with a wavelength above about 505 nm. In certain embodiments, the filter reflects about 85% of light with a wavelength below about 480 nm, and transmits about 85% of light with a wavelength above about 505 nm. In certain embodiments, the filter reflects about 90% of light with a wavelength below about 480 nm, and transmits about 90% of light with a wavelength above about 505 nm. In certain embodiments, the filter reflects about 95% of light with a wavelength below about 480 nm, and transmits about 95% of light with a wavelength above about 505 nm. In preferred embodiments, the filter reflects substantially all light with a wavelength below about 480 nm, and transmits substantially all light with a wavelength above about 505 nm.

In certain embodiments, the filter reflects about 55% of light with a wavelength below about 480 nm, and transmits about 55% of light with a wavelength above about 490 nm. In certain embodiments, the filter reflects about 60% of light with a wavelength below about 480 nm, and transmits about 60% of light with a wavelength above about 490 nm. In certain embodiments, the filter reflects about 65% of light with a wavelength below about 480 nm, and transmits about 65% of light with a wavelength above about 490 nm. In certain embodiments, the filter reflects about 70% of light with a wavelength below about 480 nm, and transmits about 70% of light with a wavelength above about 490 nm. In certain embodiments, the filter reflects about 75% of light with a wavelength below about 480 nm, and transmits about 75% of light with a wavelength above about 490 nm. In certain embodiments, the filter reflects about 85% of light with a wavelength below about 480 nm, and transmits about 85% of light with a wavelength above about 490 nm. In certain embodiments, the filter reflects about 90% of light with a wavelength below about 480 nm, and transmits about 90% of light with a wavelength above about 490 nm. In certain embodiments, the filter reflects about 95% of light with a wavelength below about 480 nm, and transmits about 95% of light with a wavelength above about 490 nm. In preferred embodiments, the filter reflects substantially all light with a wavelength below about 480 nm, and transmits substantially all light with a wavelength above about 490 nm.

In particularly preferred embodiments, the filter comprises a Bragg grating. In certain embodiments, the Bragg grating comprises alternating layers of a first material having a first index of refraction and a second material having a second index of refraction, wherein the first index of refraction is higher than the second index of refraction. The Bragg grating should preferably be made from materials that can be deposited on the lens substrate without excessing heating of the substrate, due to the low melting points of polymers such as Trivex and CR-39.

In certain embodiments, the first material is selected from $TiO_2$, $Ti_3O_5$, $TiO_x$, $Al_2O_3$, $AlO_x$, C (diamond), SiC, $SrTiO_3$, $Ta_2O_5$, $ZrO_2$, ZnS, ZnO, and any combination thereof. In another embodiment, the first material is chosen from $TiO_2$, $Ta_2O_5$, and ZnS. In another embodiment, the first material comprises $TiO_2$.

In certain embodiments, the second material is selected from $SiO_2$, SiO, $MgF_2$, $In_2O_3$, ITO (Sn-doped $In_2O_3$), polymers such as polymethyl methacrylate (PMMA), and any combination thereof. In other embodiments, the second material is selected from $SiO_2$ and $MgF_2$. In another embodiment, the second material comprises $SiO_2$.

In certain embodiments, the first material and/or second material are doped with one or more photochromic elements. In certain embodiments, the photochromic dopant is selected from Ag, Cl, Br, Cu, Mo, W, V, Nb, Ti, Ln, Ce, Pr, Nd, Sm, Eu, Gd, Tb, Dy, Ho, Er, Tm, Yb, Lu, and any combination thereof.

In certain embodiments, the Bragg grating comprises at least 10 layers. In certain embodiments, the Bragg grating comprises at least 15 layers. In certain embodiments, the Bragg grating comprises at least 20 layers. In certain embodiments, the Bragg grating comprises at least 25 layers. In certain embodiments, the Bragg grating comprises at least 30 layers. In certain embodiments, the Bragg grating comprises at least 35 layers. In certain embodiments, the Bragg grating comprises at least 40 layers.

In certain embodiments, the Bragg grating comprises more than 10 layers. In certain embodiments, the Bragg grating comprises more than 15 layers. In certain embodiments, the Bragg grating comprises more than 20 layers. In certain embodiments, the Bragg grating comprises more than 25 layers. In certain embodiments, the Bragg grating comprises more than 30 layers. In certain embodiments, the Bragg grating comprises more than 35 layers. In certain embodiments, the Bragg grating comprises more than 40 layers.

In some embodiments, the Bragg grating comprises about 10 to about 50 layers, about 10 to about 40 layers, or about 10 to about 30 layers. In other embodiments, the Bragg grating comprises about 20 to about 50 layers, about 20 to about 40 layers, about 20 to about 25 layers, about 20 to about 30 layers, or about 20 to about 25 layers. In other embodiments, the Bragg grating comprises about 25 to about 50 layers, about 25 to about 45 layers, about 25 to about 35 layers, or about 25 to about 30 layers. In still other embodiments, the Bragg grating comprises about 30 to about 50 layers, about 30 to about 45 layers, about 30 to about 40 layers, or about 30 to about 35 layers.

In certain embodiments, the Bragg grating comprises 10 layers. In certain embodiments, the Bragg grating comprises 15 layers. In certain embodiments, the Bragg grating comprises 20 layers. In certain embodiments, the Bragg grating comprises 25 layers. In certain embodiments, the Bragg grating comprises 30 layers. In certain embodiments, the Bragg grating comprises 35 layers. In certain embodiments, the Bragg grating comprises 40 layers. In some embodiments, the Bragg grating comprises 20, 21, 22, 23, 24, 25, 26, 27, 28, 29, 30, 31, 32, 33, 34, 35, 36, 37, 38, 39, or 40 layers.

In additional aspects, provided herein are transition optical filters for reducing the amount of melatonin-inhibiting light transmitted to an eye of a subject, wherein the filters reflect at least 50% of light with a wavelength below about 560 nm, transmit at least 50% of light with a wavelength above about 570 nm, and are activated by low wavelength light with a wavelength between about 466 and about 470 nm. In some embodiments, the transition optical filter reflects at least 80% of light with a wavelength below about 560 nm, and transmits at least 80% of light with a wavelength above about 570 nm. In other embodiments, the filter reflects substantially all light with a wavelength below about 560 nm, and transmits substantially all light with a wavelength above about 570 nm.

In certain embodiments, the transition optical filter reflects about 55% of light with a wavelength below about 495 nm, and transmits about 55% of light with a wavelength above about 505 nm. In certain embodiments, the transition optical filter reflects about 60% of light with a wavelength below about 495 nm, and transmits about 60% of light with a wavelength above about 505 nm. In certain embodiments, the transition optical filter reflects about 65% of light with a wavelength below about 495 nm, and transmits about 65% of light with a wavelength above about 505 nm. In certain embodiments, the transition optical filter reflects about 70% of light with a wavelength below about 495 nm, and transmits about 70% of light with a wavelength above about 505 nm. In certain embodiments, the transition optical filter reflects about 75% of light with a wavelength below about 495 nm, and transmits about 75% of light with a wavelength above about 505 nm. In certain embodiments, the transition optical filter reflects about 85% of light with a wavelength below about 495 nm, and transmits about 85% of light with a wavelength above about 505 nm. In certain embodiments, the transition optical filter reflects about 90% of light with a wavelength below about 495 nm, and transmits about 90% of light with a wavelength above about 505 nm. In certain embodiments, the transition optical filter reflects about 95% of light with a wavelength below about 495 nm, and transmits about 95% of light with a wavelength above about 505 nm. In preferred embodiments, the transition optical filter reflects substantially all light with a wavelength below about 495 nm, and transmits substantially all light with a wavelength above about 505 nm.

In certain embodiments, the transition optical filter reflects about 55% of light with a wavelength below about 480 nm, and transmits about 55% of light with a wavelength above about 505 nm. In certain embodiments, the transition optical filter reflects about 60% of light with a wavelength below about 480 nm, and transmits about 60% of light with a wavelength above about 505 nm. In certain embodiments, the transition optical filter reflects about 65% of light with a wavelength below about 480 nm, and transmits about 65% of light with a wavelength above about 505 nm. In certain embodiments, the transition optical filter reflects about 70% of light with a wavelength below about 480 nm, and transmits about 70% of light with a wavelength above about 505 nm. In certain embodiments, the transition optical filter reflects about 75% of light with a wavelength below about 480 nm, and transmits about 75% of light with a wavelength above about 505 nm. In certain embodiments, the transition optical filter reflects about 85% of light with a wavelength below about 480 nm, and transmits about 85% of light with a wavelength above about 505 nm. In certain embodiments, the transition optical filter reflects about 90% of light with a wavelength below about 480 nm, and transmits about 90% of light with a wavelength above about 505 nm. In certain embodiments, the transition optical filter reflects about 95% of light with a wavelength below about 480 nm, and transmits about 95% of light with a wavelength above about 505 nm. In preferred embodiments, the transition optical filter reflects substantially all light with a wavelength below about 480 nm, and transmits substantially all light with a wavelength above about 505 nm.

In certain embodiments, the transition optical filter reflects about 55% of light with a wavelength below about 480 nm, and transmits about 55% of light with a wavelength above about 490 nm. In certain embodiments, the transition optical filter reflects about 60% of light with a wavelength below about 480 nm, and transmits about 60% of light with a wavelength above about 490 nm. In certain embodiments, the transition optical filter reflects about 65% of light with a wavelength below about 480 nm, and transmits about 65% of light with a wavelength above about 490 nm. In certain embodiments, the transition optical filter reflects about 70% of light with a wavelength below about 480 nm, and transmits about 70% of light with a wavelength above about 490 nm. In certain embodiments, the transition optical filter reflects about 75% of light with a wavelength below about 480 nm, and transmits about 75% of light with a wavelength above about 490 nm. In certain embodiments, the transition optical filter reflects about 85% of light with a wavelength below about 480 nm, and transmits about 85% of light with a wavelength above about 490 nm. In certain embodiments, the transition optical filter reflects about 90% of light with a wavelength below about 480 nm, and transmits about 90% of light with a wavelength above about 490 nm. In certain embodiments, the transition optical filter reflects about 95% of light with a wavelength below about 480 nm, and transmits about 95% of light with a wavelength above about 490 nm. In preferred embodiments, the transition optical filter reflects substantially all light with a wavelength below about 480 nm, and transmits substantially all light with a wavelength above about 490 nm.

In particularly preferred embodiments, the transition optical filter comprises a Bragg grating. In certain embodiments, the Bragg grating comprises alternating layers of a first material having a first index of refraction and a second material having a second index of refraction, wherein the first index of refraction is higher than the second index of refraction. The Bragg grating should preferably be made from materials that can be deposited on the lens substrate without excessing heating of the substrate, due to the low melting points of polymers such as Trivex and CR-39.

In certain embodiments, the first material is selected from $TiO_2$, $Ti_3O_5$, $TiO_x$, $Al_2O_3$, $AlO_x$, C (diamond), SiC, $SrTiO_3$, $Ta_2O_5$, $ZrO_2$, ZnS, ZnO, and any combination thereof. In another embodiment, the first material is chosen from $TiO_2$, $Ta_2O_5$, and ZnS. In another embodiment, the first material comprises $TiO_2$.

In certain embodiments, the second material is selected from $SiO_2$, SiO, $MgF_2$, $In_2O_3$, ITO (Sn-doped $In_2O_3$), polymers such as polymethyl methacrylate (PMMA), and any combination thereof. In other embodiments, the second material is selected from $SiO_2$ and $MgF_2$. In another embodiment, the second material comprises $SiO_2$.

In certain embodiments, the first material and/or second material are doped with one or more photochromic elements. In certain embodiments, the photochromic dopant is selected from Ag, Cl, Br, Cu, Mo, W, V, Nb, Ti, Ln, Ce, Pr, Nd, Sm, Eu, Gd, Tb, Dy, Ho, Er, Tm, Yb, Lu, and any combination thereof.

In certain embodiments, the Bragg grating comprises at least 10 layers. In certain embodiments, the Bragg grating comprises at least 15 layers. In certain embodiments, the Bragg grating comprises at least 20 layers. In certain embodiments, the Bragg grating comprises at least 25 layers. In certain embodiments, the Bragg grating comprises at least 30 layers. In certain embodiments, the Bragg grating comprises at least 35 layers. In certain embodiments, the Bragg grating comprises at least 40 layers.

In certain embodiments, the Bragg grating comprises more than 10 layers. In certain embodiments, the Bragg grating comprises more than 15 layers. In certain embodiments, the Bragg grating comprises more than 20 layers. In certain embodiments, the Bragg grating comprises more than 25 layers. In certain embodiments, the Bragg grating comprises more than 30 layers. In certain embodiments, the Bragg grating comprises more than 35 layers. In certain embodiments, the Bragg grating comprises more than 40 layers.

In some embodiments, the Bragg grating comprises about 10 to about 50 layers, about 10 to about 40 layers, or about 10 to about 30 layers. In other embodiments, the Bragg grating comprises about 20 to about 50 layers, about 20 to about 40 layers, about 20 to about 25 layers, about 20 to about 30 layers, or about 20 to about 25 layers. In other embodiments, the Bragg grating comprises about 25 to about 50 layers, about 25 to about 45 layers, about 25 to about 35 layers, or about 25 to about 30 layers. In still other embodiments, the Bragg grating comprises about 30 to about 50 layers, about 30 to about 45 layers, about 30 to about 40 layers, or about 30 to about 35 layers.

In certain embodiments, the Bragg grating comprises 10 layers. In certain embodiments, the Bragg grating comprises 15 layers. In certain embodiments, the Bragg grating comprises 20 layers. In certain embodiments, the Bragg grating comprises 25 layers. In certain embodiments, the Bragg grating comprises 30 layers. In certain embodiments, the Bragg grating comprises 35 layers. In certain embodiments, the Bragg grating comprises 40 layers. In some embodiments, the Bragg grating comprises 20, 21, 22, 23, 24, 25, 26, 27, 28, 29, 30, 31, 32, 33, 34, 35, 36, 37, 38, 39, or 40 layers.

Lenses

One aspect of the present disclosure is sleep-aiding eyewear with improved visibility produced using a Bragg grating. To produce this, lenses may be procured that use standard lens material, such as polycarbonate, CR-39, or Trivex. Prior to depositing the coating on the lens, dimensions of the coating and thickness of each layer are calculated using Fresnel's equations, to determine suitability for the lens coatings. FIGS. 1 through 4 show the output of these calculations for the embodiment of the disclosure described here.

In some embodiments of the present disclosure, the optical filter coating is used in conjunction with an antireflective coating and/or a tinted lens, to both achieve the desired optical effect and prevent excess light from reaching the retina due to reflection of light behind the wearer.

In other aspects, provided herein are lenses for reducing the amount of melatonin-inhibiting light transmitted to an eye of a subject, the lens comprising:
  a) a substrate, said substrate having an outer and inner surface;
  b) the optical filter of any one of claims 1-10, said filter having an outer and inner surface; and
  c) a coating, said coating having an outer and inner surface.

In certain embodiments, the substrate is of a sufficient size to afford coverage of the eye such that it does not allow substantial light to shine on the eye. In certain embodiments, the coating is selected from an antireflective coating or a tint. In certain embodiments, the coating comprises an antireflective coating and a tint. In certain embodiments, the coating reduces the reflectance of the filter.

In various embodiments, the substrate may be any suitable polymer that allows the transmission of light. In certain embodiments, the substrate is selected from polycarbonate, polyurethane, and copolymers thereof allyl diglycol carbonate (CR-39), urethanes enriched with nitrogen or sulfur (Trivex), and glass. In preferred embodiments, the substrate comprises polycarbonate.

In certain embodiments, the inner surface of the filter is disposed along the outer surface of the substrate, and the coating is disposed along the outer surface of the filter. In certain embodiments, the coating is disposed along the outer surface of the substrate, and the inner surface of the filter is disposed along the outer surface of the coating.

Another aspect of the present disclosure is sleep-aiding eyewear that can transition from being clear to absorbing melatonin shifting light (e.g., light between about 380 and about 560 nm). This can advantageously be achieved using a Bragg grating and nonlinear optical materials, by using photochromic organic dyes, and by several other methods. In some embodiments of these transition lenses, the material having the higher index of refraction in the Bragg grating is a photochromic material. In some embodiments, the photochromic material is an oxide doped with another element. In some embodiments, the photochromic material is a hybrid organic-inorganic material. In additional aspects, provided herein are transition optical filters for reducing the amount of melatonin-inhibiting light transmitted to an eye of a subject, wherein the filters reflect up to about 80% of light with a wavelength before about 560 nm, transmit about 80% of light with a wavelength above 570 nm, and are activate by a low wavelength light with a wavelength between about 466 and about 470 nm.

FIG. 1 shows a diagram of a thin film stack 100 used as the lens coating to prevent transmission of melatonin inhibiting light. In various embodiments, the stack 100 includes at least two films (e.g., first film 102a, second film 102b) applied to a substrate 104. In various embodiments, the first film 102a and the second film 102b may be applied to the substrate in an alternating arrangement. For example, the first film 102a may be deposited first and allowed to set/cure before the second film 102b is deposited and allowed to set/cure. In various embodiments, the stack 100 may include two or more repeated subunits 103 of the at least two films. For example, the first film 102a and the second film 102b may form a subunit 103 that is repeated two or more times. For example, the subunit 103 may be repeated up to 30 times. In various embodiments, the layers 102a, 102b may include an oxidized metal. In various embodiments, the oxidized metal may be titanium dioxide. In various embodiments, the oxidized metal may be silicon dioxide. In various embodiments, the layers 102a, 102b may be up to 200 nm thick. In various embodiments, each of the layers 102a, 102b may have substantially the same thickness. For example, each layer may be approximately 100 nm thick. In various embodiments, the layers may vary in thickness. For example, the first layer 102a may be 100 nm thick while the second layer 102b is 200 nm thick, or vice versa. In some embodiments, the layers are about 50 nm to about 300 nm, about 50 to about 250 nm, about 50 nm to about 200 nm, about 75 nm to about 200 nm about 75 nm to about 150 nm, about 75 nm to about 100 nm, about 100 nm to about 200 nm, or about 100 nm to about 150 nm thick. The layers may have substantially similar thicknesses, or the layers may have differing thicknesses.

Figure 2:
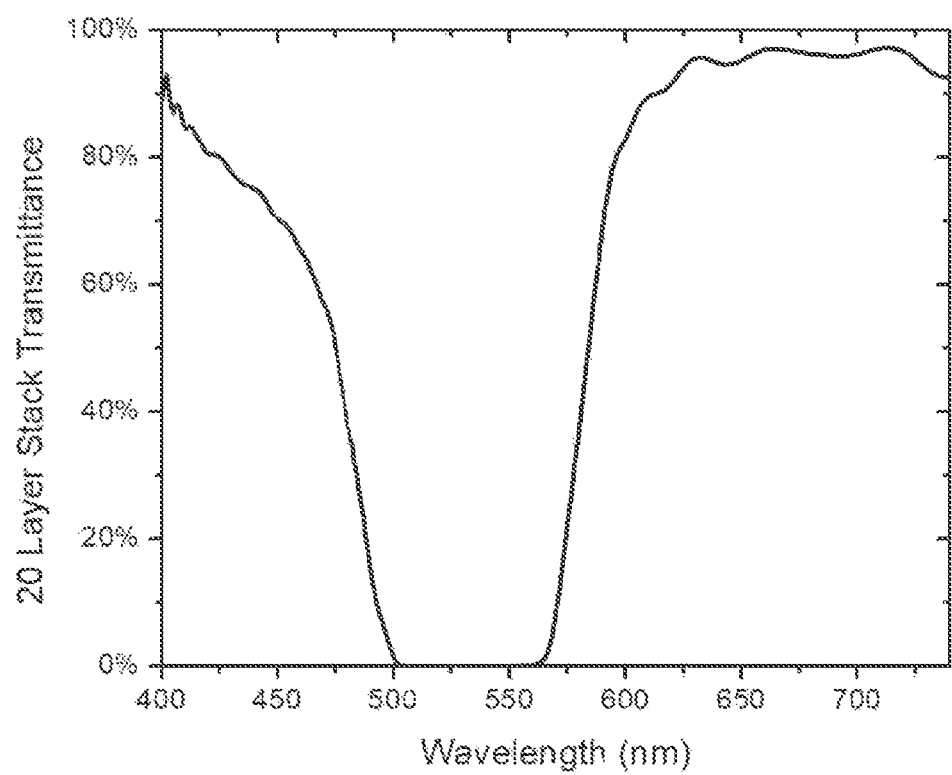
FIG. 2 is a UV-Visible spectrum showing the transmittance, simulated using Fresnel's equations, of a 20 layer stack of alternating $SiO_2$ and $TiO_2$ thin films of approximately 100 nm thickness each on a CR-39 lens in air according to embodiments of the present disclosure.

FIG. 2 is a UV-Visible spectrum showing the transmittance, simulated using Fresnel's equations, of a 20 layer stack of alternating SiO$_2$ and TiO$_2$ thin films of approximately 100 nm thickness each on a CR-39 lens in air.

Figure 3:
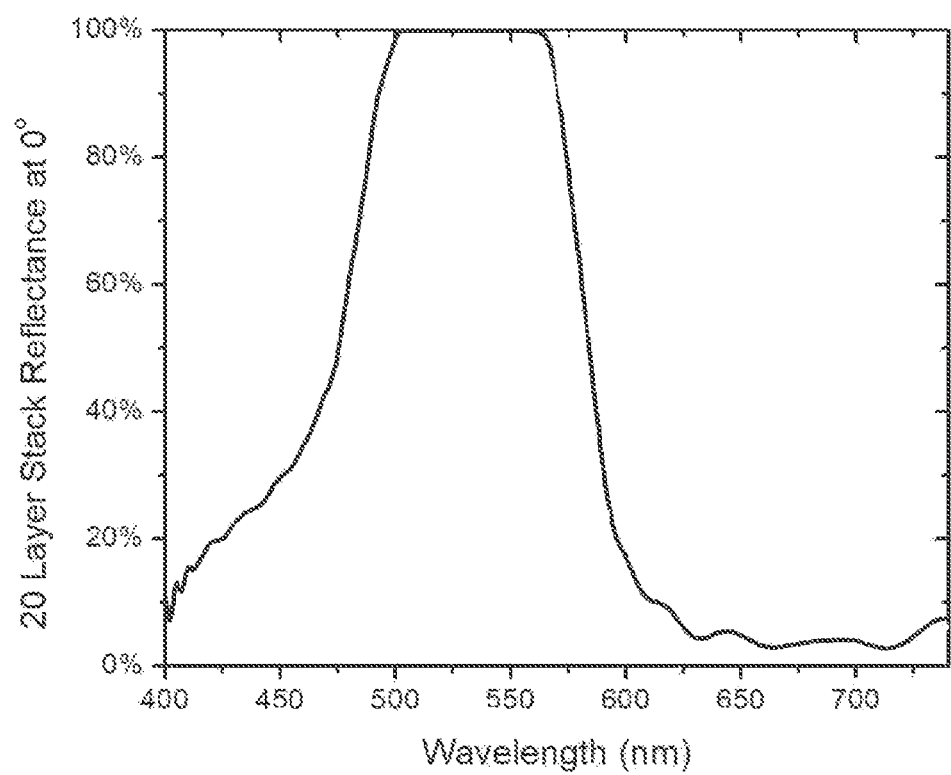
FIG. 3 is a UV-Visible spectrum showing the reflectance of the stack in FIG. 2 when looked at directly, perpendicular to the plane of the lens (zero degrees) according to embodiments of the present disclosure.

FIG. 3 is a UV-Visible spectrum showing the reflectance of the stack in FIG. 2 when looked at directly, perpendicular to the plane of the lens (zero degrees).

Figure 4:
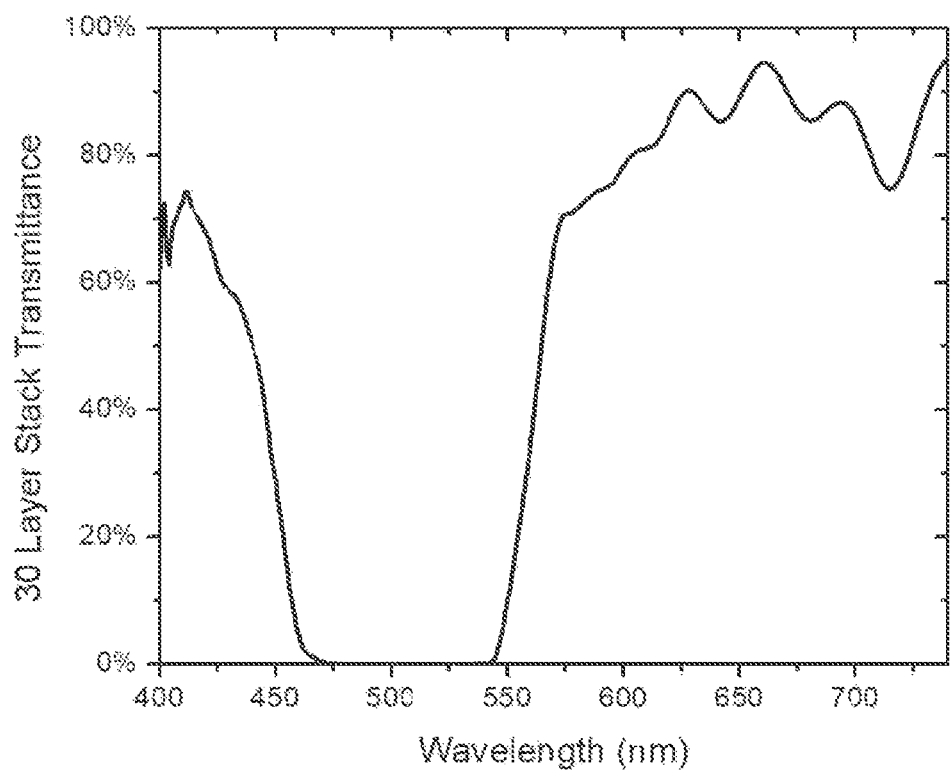
FIG. 4 is a UV-Visible spectrum showing the transmittance, simulated using Fresnel's equations, of a 30 layer stack of alternating $SiO_2$ and $TiO_2$ thin films of approximately 100 nm thickness each on a CR-39 lens in air according to embodiments of the present disclosure.

FIG. 4 is a UV-Visible spectrum showing the transmittance, simulated using Fresnel's equations, of a 30 layer stack of alternating SiO$_2$ and TiO$_2$ thin films of approximately 100 nm thickness each on a CR-39 lens in air.

Figure 5:
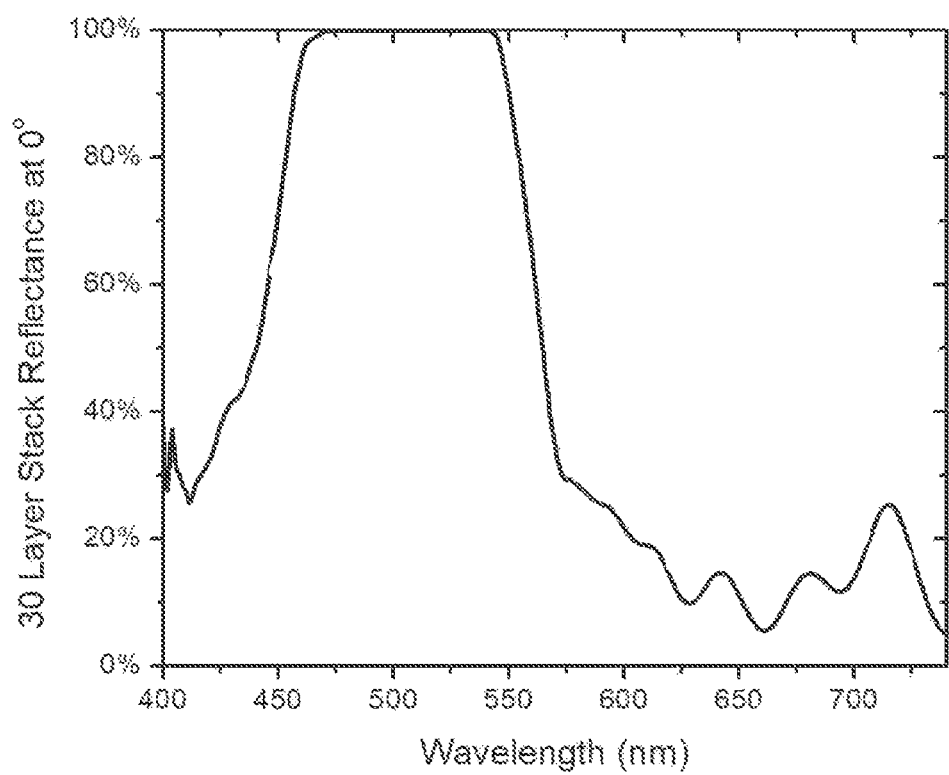
FIG. 5 is a UV-Visible spectrum showing the reflectance of the stack in FIG. 4 when looked at directly, perpendicular to the plane of the lens (zero degrees) according to embodiments of the present disclosure.

FIG. 5 is a UV-Visible spectrum showing the reflectance of the stack in FIG. 4 when looked at directly, perpendicular to the plane of the lens (zero degrees).

Figure 6:
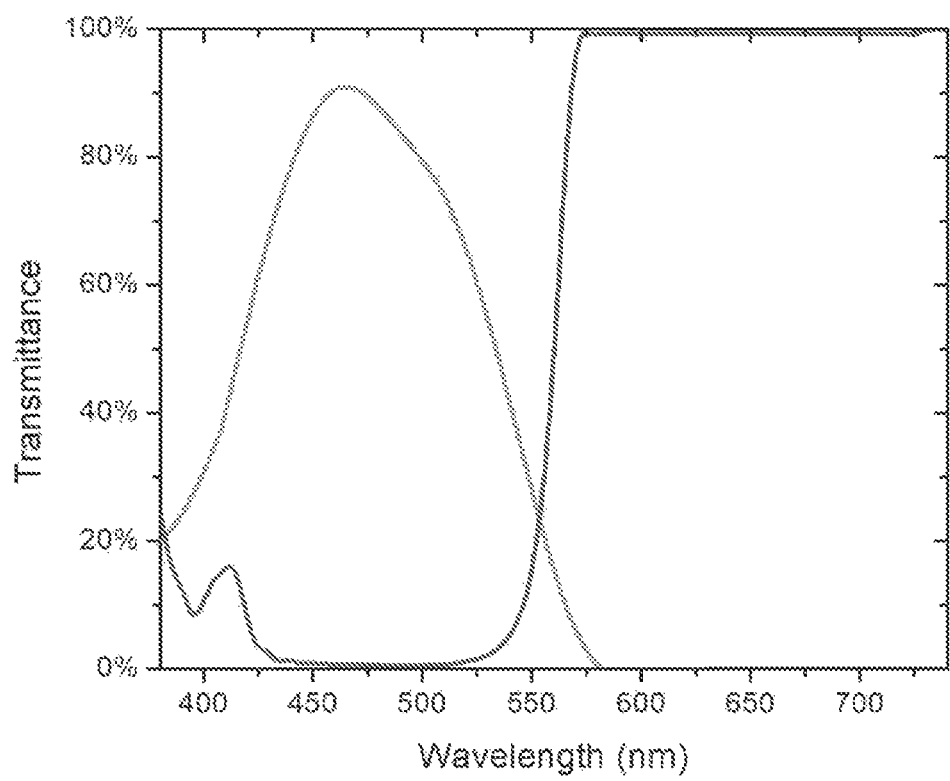
FIG. 6 is a UV-Visible spectrum showing the transmittance of a 30-layer stack on a Trivex lens according to embodiments of the present disclosure.

FIG. 6 is a UV-Visible spectrum showing the transmittance of a 30-layer stack on a Trivex lens according to embodiments of the present disclosure. FIG. 6 also depicts the melatonin action spectrum for comparison.

Figure 7:
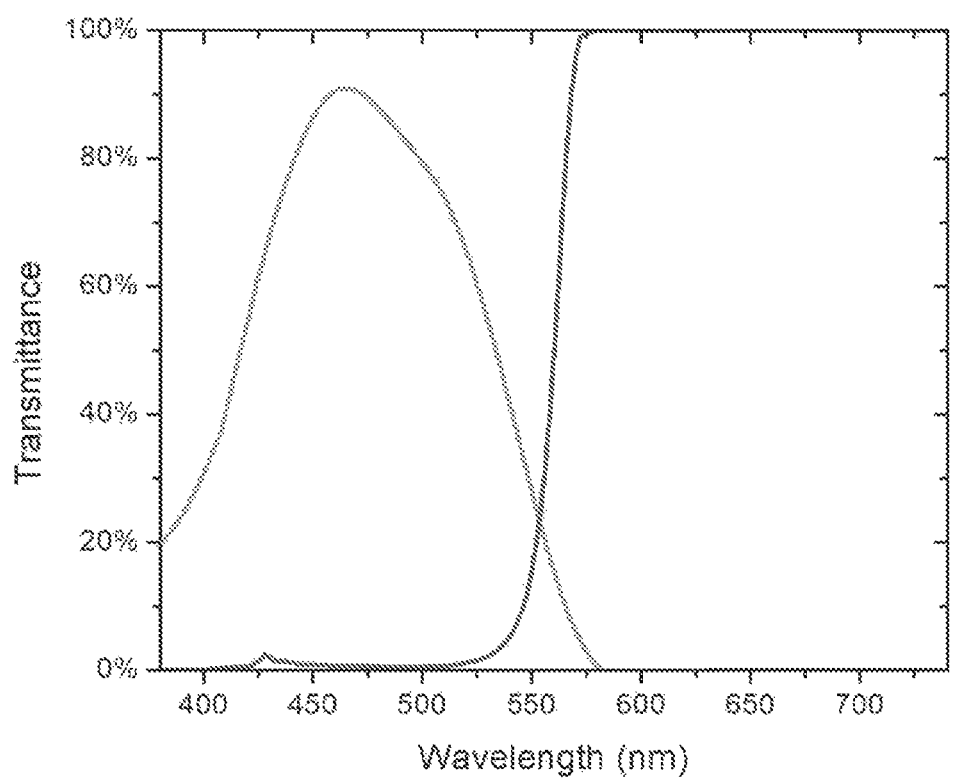
FIG. 7 is a UV-Visible spectrum showing the transmittance of a 30-layer stack with a yellow tinted lens as a substrate to further block short wavelength light according to embodiments of the present disclosure.

FIG. 7 is a UV-Visible spectrum showing the transmittance of a 30-layer stack with a yellow tinted lens as a substrate to further block short wavelength light according to embodiments of the present disclosure. FIG. 7 also depicts the melatonin action spectrum for comparison.

Figure 8:
FIG. 8 is a photograph of a Trivex lens with a 20-layer stack coating taken perpendicular to the plane of the lens (zero degrees) according to embodiments of the present disclosure.

FIG. 8 is a photograph of a Trivex lens with a 20-layer stack coating taken perpendicular to the plane of the lens (zero degrees).

Figure 9:
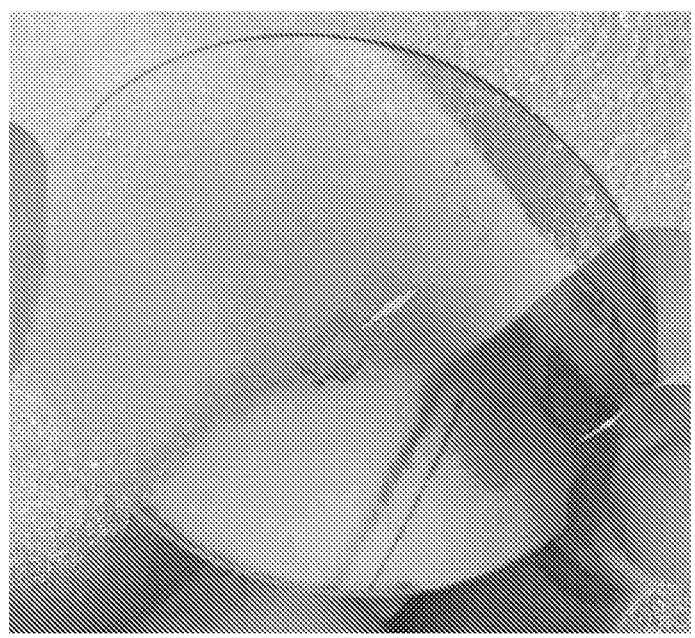
FIG. 9 is a photograph of a Trivex lens with a 20-layer stack coating taken at an approximately 20-degree angle to the plane of the lens showing a change in reflectance from orange light to blue light according to embodiments of the present disclosure.

FIG. 9 is a photograph of a Trivex lens with a 20-layer stack coating taken at an approximately 20-degree angle to the plane of the lens showing a change in reflectance from orange light to blue light.

Figure 10:
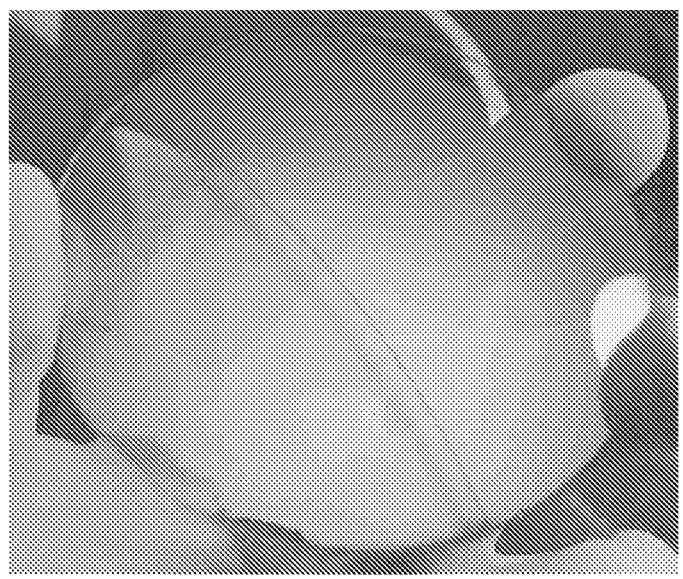
FIG. 10 is a photograph of a Trivex lens with a 20-layer stack coating taken at an approximately 45-degree angle to the plane of the lens showing a change in reflectance fully to blue light according to embodiments of the present disclosure.

FIG. 10 is a photograph of a Trivex lens with a 20-layer stack coating taken at an approximately 45-degree angle to the plane of the lens showing a change in reflectance fully to blue light.

Devices

In particular aspects, provided herein are devices comprising:
  a frame;
  at least of the lenses described herein disposed within the frame;
  a first arm hingedly coupled to the frame at a first end; and
  a second arm hingedly coupled to the frame at a second end.

Various embodiments of the present disclosure are directed to spectacle lens ophthalmic eyewear that include ophthalmic lenses and contact lenses. An ophthalmic lens can be a spectacle lens or a lens mounted in ophthalmic eyewear suitable for use by a wearer. The ophthalmic eyewear may include a right lens and a left lens. The eyewear may be designed to sit in the spectacle plane or in another plane as in a goggle or other head mounted format.

A contact lens may comprise any lens configured to be positioned in direct contact with a wearer's eye. The contact lens can be a soft lens, rigid lens, hybrid lens, intracorneal lens, corneal onlay, or intraocular lens, manufactured from any suitable material or combination of materials such as, for example, one or more of fluorosilicon acrylate, silicon acrylate, polymethylmethacrylate, a silicon hydrogel, or other biocompatible materials and/or suitably transparent materials, and the like, which can be soft, rigid or a combination of soft and rigid, and which are suitable for the machining, casting or other processing used to manufacture the lens.

Figure 11:
FIG. 11 is a photograph of an individual wearing sleep-aiding eyewear according to embodiments of the present disclosure.

FIG. 11 is a photograph of an individual wearing sleep-aiding eyewear according to an embodiment of the present disclosure.

Figure 12A:
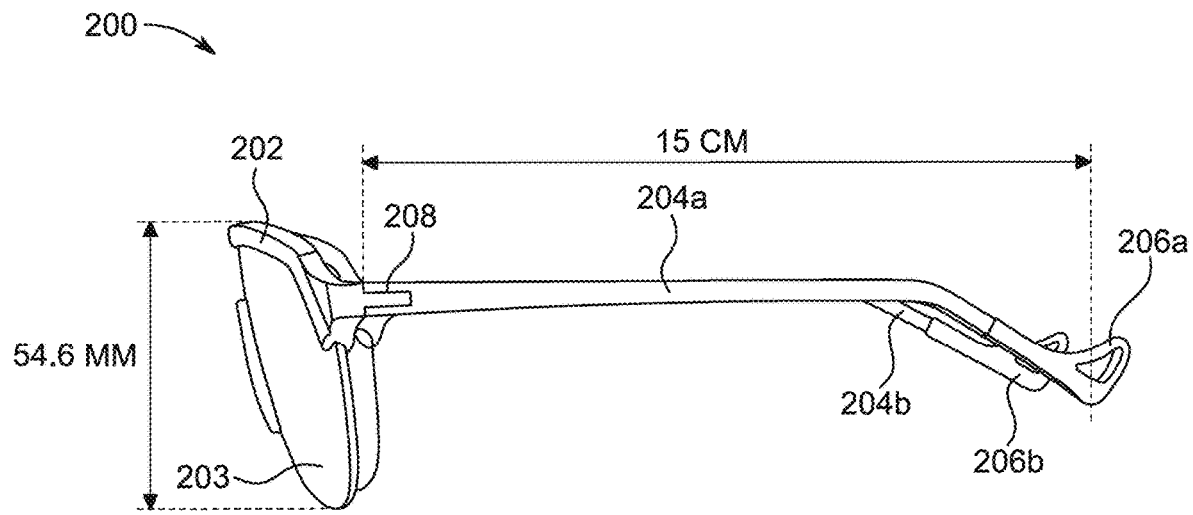
FIG. 12A illustrates a side-view diagram of eyewear with sufficient coverage over the field of view for an individual to maintain sight while minimizing the amount of melatonin-suppressing light that reaches the retina according to embodiments of the present disclosure.
Figure 12B:
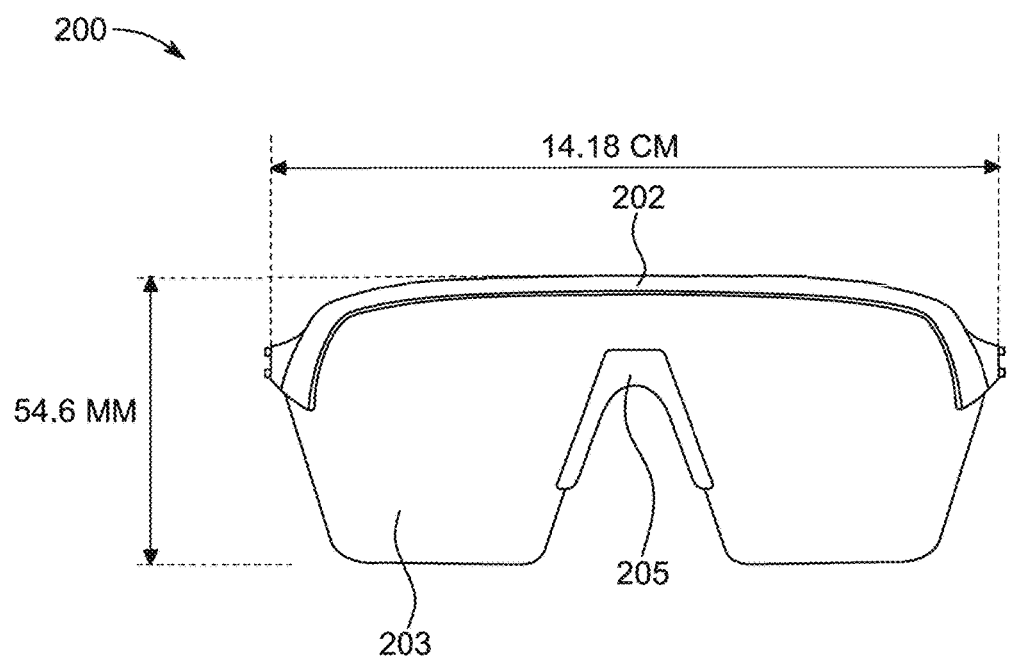
FIG. 12B illustrates a front-view diagram of eyewear with sufficient coverage over the field of view for an individual to maintain sight while minimizing the amount of melatonin-suppressing light that reaches the retina according to embodiments of the present disclosure.

FIGS. 12A and 12B illustrate a diagram of eyewear 200 with sufficient coverage over the field of view for an individual to maintain sight while minimizing the amount of melatonin-suppressing light that reaches the retina. In various embodiments, as shown in FIGS. 12A-12B, the eyewear 200 includes a frame 202 having one or more lenses 203. In various embodiments, the frame 202 may include a single beam and a nose piece 205. In various embodiments, the frame may include two discrete portions configured to hold individual lenses. In various embodiments, the lens 203 may be a single integral lens that spans the width of both eyes. In various embodiments, the lens 203 may include two discrete lenses, one lens for each eye.

As shown in FIG. 12B, the frame 202 is hingedly coupled (via hinges 208) to arms 204a, 204b having a folded configuration and an unfolded configuration. In various embodiments, the arms are configured to extend approximately perpendicularly from the frame while in the unfolded configuration such that each end 206a, 206b extend over (e.g., contacts) an ear of a wearer. In various embodiments, each arm 204a, 204b may fold inwardly towards the other arm 204a, 204b to assume a folded configuration.

Methods of Making

In further aspects, provided herein are methods of making the disclosed filters. In certain embodiments, the method comprises:
- (a) contacting one or more pellets of the first material with an electron beam under vacuum to evaporate particles of the first material;
- (b) contacting one or more pellets of the second material with an electron beam under vacuum to evaporate particles of the second material; and
- (c) depositing the particles of the first material and the particles of the second material onto a substrate, thereby forming the optical filter;

wherein steps (a) and (b) occur sequentially.

In certain embodiments, hard-coated lenses are loaded into a vacuum coater along with pellets of the first material and pellets of the second material. Once under vacuum, the first material and the second material are contacted separately and sequentially by an electron beam to evaporate the oxide materials onto the hard-coated lenses to form thin films of each material on the lenses.

In some embodiments, the vacuum coater uses chemical vapor deposition (CVD). In some embodiments, the vacuum coater uses plasma-enhanced chemical vapor deposition (PE-CVD). In some embodiments, the vacuum coater uses physical vapor deposition (PVD). In some embodiments, the vacuum coater uses sputtering. In some embodiments, the vacuum coater uses electron-beam evaporation.

In certain aspects, provided herein are methods of making the disclosed lenses. In certain embodiments, the method comprises:
- (a) contacting one or more pellets of the first material with an electron beam under vacuum to evaporate particles of the first material;
- (b) contacting one or more pellets of the second material with an electron beam under vacuum to evaporate particles of the second material; and
- (c) depositing the particles of the first material and the particles of the second material onto the outer surface of the coating, thereby forming the lens;

wherein steps (a) and (b) occur sequentially.

In certain embodiments, lenses are milled to a base curve between 2 and 6, followed by application of a hard coating between the thickness of 1 micron and 10 microns. Such hard coatings may be applied by spin coating or dip coating followed by curing under ultraviolet light. The resulting hard coating may be an organic-inorganic coating comprising $SiO_2$-polyethylene oxide or $SiO_2$-polyethylene oxide-polymethyl methacrylate.

In certain embodiments, the lens comprises a hard coating between the substrate and the optical filter. The preferred identity of the hard coating differs depending on the composition of the substrate. For example, when the substrate comprises CR-39, the hard coating is typically an approximately 2 micron coating of $SiO_2$-polyethylene oxide ($SiO_2$-PEO). When the substrate comprises polycarbonate or Trivex, the hard coating is typically an approximately 5 micron coating of $SiO_2$-polyethylene oxide-polymethyl methacrylate ($SiO_2$-PEO-PMMA).

In further embodiments, the lens comprises a hydrophobic coating on the outer surface of the optical filter. A hydrophobic coating may be made, for example, by dipping a substrate in a solution of 5% dichlorodimethylsilane in n-hexanes for 60 seconds, then curing at 80° C. in air for 30 minutes to result in a 50 nm thick hydrophobic film. In such embodiments, the hydrophobic coating may be a partially chlorinated siloxane polymer thin film.

In some embodiments, the Bragg grating is synthesized by electron beam evaporation of precursor materials, such as silicon oxide and titanium dioxide, onto the lenses.

Using physical vapor deposition, an electron beam evaporator, or one of several other coating methods known to those skilled in the art, alternating layers of $TiO_2$ and $SiO_2$ can be prepared on the lens. These alternating layers are around 100 nm each. Once these are deposited on the lens, the lens will assume coloration concomitant with a Bragg grating centered around 500 nm, with an orange hue when looking through the lens perpendicular to the plane of the lens, gradually fading to a blue hue then clear as the angle of incidence is changed.

Once these lenses are completed, tinting and antireflection coatings can be added to further tune the properties of the lens, to ensure ideal visibility for the wearer. The lenses are then cut and mounted into a suitable frame that covers substantially all of the field of view for the wearer, so that stray light does not reach the retina.

EXAMPLES

Example 1: Laboratory-Scale Preparation of Bragg Grating Lens

Metal-organic precursors titanium isopropoxide (TIPT, $Ti[OCH(CH_3)_2]_4$) and tetraethyl orthosilicate (TEOS, $Si[OC_2H_5]_4$) were loaded into heated canisters connected to a tube furnace for atmospheric pressure chemical vapor deposition (APCVD). Laboratory-scale preparation of Bragg Grating Lenses was achieved on 1" diameter fused silica slides. The fused silica was first washed with water and ethanol, then sonicated in an acetone bath to remove any surface impurities for 5 minutes. The fused silica was placed in the tube furnace with a 3" diameter quartz tube and heated to 600° C. at a ramp rate of 12° C./min.

Once the target temperature was achieved, the vaporous metal-organic precursors were manually introduced using ball valves. First, the TEOS was introduced to the 3" diameter quartz tube for approximately 35 seconds, followed by a one-minute hold to purge the quartz tube. Second, the TIPT was introduced to the 3" diameter quartz tube for approximately 20 seconds, followed by a one-minute hold to purge the quartz tube. This process was repeated 15 times to result in a 30-layer film of alternating $SiO_2$ and $TiO_2$ layers.

After completion of film deposition, the tube furnace was cooled overnight at a rate of 2° C./min to prevent film cracking. The coated film was washed with ethanol and measured using ultraviolet-visible (UV-Vis) spectroscopy to assess successful film deposition and formation of the Bragg grating.

Example 2: Production-Scale Preparation of Bragg-Grating Lens

Hard coated polycarbonate lenses tinted orange to approximately 80% transmittance with 2.0 mm center thickness and a 4.0 base curve are loaded into a Satisloh 1200-DLX-2 high throughput vacuum box coater for physical vapor deposition (PVD). 1-3 mm granules of silicon dioxide and titanium dioxide are separately loaded into two the evaporant chambers. The system is programmed to evaporate the silicon dioxide and titanium dioxide sequentially by irradiating the evaporant granules with an electron beam to produce a 30-layer film on the convex of the lenses, followed by deposition of an antireflection coating by thermal evaporation on the concave side of the polycarbonate lenses. After completion of the PVD run, the lenses are analyzed by UV-Vis spectroscopy to assess successful film deposition and formation of the Bragg grating.

Example 3: Incorrect Tinting Causes Excess Internal Reflection

Untinted hard coated polycarbonate lenses with 2.0 mm center thickness and a 4.0 base curve are loaded into a Satisloh 1200-DLX-2 high throughput vacuum box coater for physical vapor deposition (PVD). 1-3 mm granules of silicon dioxide and titanium dioxide are separately loaded into two the evaporant chambers. The system is programmed to evaporate the silicon dioxide and titanium dioxide sequentially by irradiating the evaporant granules with an electron beam to produce a 30-layer film on the convex of the lenses, followed by deposition of an antireflection coating by thermal evaporation on the concave side of the polycarbonate lenses. When incorporated into a frame, the wearer's visibility is inhibited by reflection of blue and green light from the inside of the lens due to the high reflectivity of the 30-layer film overcoming the internal antireflection coating, showing that an absorptive tint to the hard coated polycarbonate lenses is preferable.

Example 4: Bragg Grating Layers are Too Thick

Metal-organic precursors titanium isopropoxide (TIPT, Ti[OCH(CH$_3$)$_2$]$_4$) and tetraethyl orthosilicate (TEOS, Si[OC$_2$H$_5$]$_4$) were loaded into heated canisters connected to a tube furnace for atmospheric pressure chemical vapor deposition (APCVD). Laboratory-scale preparation of Bragg Grating Lenses was achieved on 1" diameter fused silica slides. The fused silica was first washed with water and ethanol, then sonicated in an acetone bath to remove any surface impurities for 5 minutes. The fused silica was placed in the tube furnace with a 3" diameter quartz tube and heated to 600° C. at a ramp rate of 12° C./min.

Once the target temperature was achieved, the vaporous metal-organic precursors were manually introduced using ball valves. First, the TEOS was introduced to the 3" diameter quartz tube for approximately one minute and thirty seconds, followed by a one-minute hold to purge the quartz tube. Second, the TIPT was introduced to the 3" diameter quartz tube for approximately 20 seconds, followed by a one-minute hold to purge the quartz tube. This process was repeated 15 times to result in a 30-layer film of alternating SiO$_2$ and TiO$_2$ layers.

After completion of film deposition, the tube furnace was cooled overnight at a rate of 2° C./min. The resulting film, when removed from the furnace had excessive cracking due to the increased exposure time of the metal-organic precursors and was unfit for use.

Example 5: Incorrect Number of Layers for the Bragg Grating

Metal-organic precursors titanium isopropoxide (TIPT, Ti[OCH(CH$_3$)$_2$]$_4$) and tetraethyl orthosilicate (TEOS, Si[OC$_2$H$_5$]$_4$) were loaded into heated canisters connected to a tube furnace for atmospheric pressure chemical vapor deposition (APCVD). Laboratory-scale preparation of Bragg Grating Lenses was achieved on 1" diameter fused silica slides. The fused silica was first washed with water and ethanol, then sonicated in an acetone bath to remove any surface impurities for 5 minutes. The fused silica was placed in the tube furnace with a 3" diameter quartz tube and heated to 600° C. at a ramp rate of 12° C./min.

Once the target temperature was achieved, the vaporous metal-organic precursors were manually introduced using ball valves. First, the TEOS was introduced to the 3" diameter quartz tube for approximately 35 seconds, followed by a one-minute hold to purge the quartz tube. Second, the TIPT was introduced to the 3" diameter quartz tube for approximately 20 seconds, followed by a one-minute hold to purge the quartz tube. This process was repeated 10 times to result in a 20-layer film of alternating Sift and TiO$_2$ layers.

After completion of film deposition, the tube furnace was cooled overnight at a rate of 2° C./min to prevent film cracking. The resulting films, as measured by UV-Vis, had excessive transmittance in the 350-450 nm range due to the incorrect number of layers in the Bragg grating, which also gave them a pink color that is undesirable.

Example 6: Incorrect Deposition Temperature for the Bragg Grating on Plastic

Precursors for MgF$_2$ and ZnS are loaded into heated canisters connected to a tube furnace for atmospheric pressure chemical vapor deposition (APCVD). A hard-coated polycarbonate lens with 2.0 mm center thickness and a 4.0 base curve is first washed with water and ethanol, then sonicated in an ethanol bath to remove any surface impurities for 5 minutes. The polycarbonate is placed in a tube furnace with a 3" diameter quartz tube and heated to 300° C. at a ramp rate of 12° C./min. Due to the local high temperature and the relatively low melting point of polycarbonate, the polycarbonate lens is deformed or melted during the deposition process, rendering it unusable.

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the present disclosure have been discussed, the above specification is illustrative and not restrictive. Many variations of the disclosure will become apparent to those skilled in the art upon review of this specification and the claims below. The full scope of the disclosure should be determined by reference to the claims, along with their full scope of equivalents, and the specification, along with such variations.

We claim:

1. An optical filter, wherein the filter comprises a Bragg grating; the Bragg grating comprises alternating layers of a first material having a first index of refraction and a second material having a second index of refraction, wherein the first index of refraction is higher than the second index of refraction; and the filter reflects at least 80% of light with a wavelength below 560 nm, and transmits at least 80% of light with a wavelength above 570 nm.

2. The filter of claim 1, wherein the filter reflects substantially all light with a wavelength below 560 nm, and transmits substantially all light with a wavelength above 570 nm.

3. An optical filter, wherein the filter comprises a Bragg grating; the Bragg grating comprises alternating layers of a first material having a first index of refraction and a second material having a second index of refraction, wherein the first index of refraction is higher than the second index of refraction; and the filter reflects at least 80% of light with a wavelength below 480 nm, and transmits at least 80% of light with a wavelength above 505 nm.

4. The filter of claim 3, wherein the filter reflects substantially all light with a wavelength below 480 nm, and transmits substantially all light with a wavelength above 505 nm.

5. The filter of claim 1, wherein the first material is selected from $TiO_2$, $Ti_3O_5$, $TiO_x$, $Al_2O_3$, $AlO_x$, C (diamond), SiC, $SrTiO_3$, $Ta_2O_5$, $ZrO_2$, ZnS, ZnO, and any combination thereof.

6. The filter of claim 1, wherein the first material comprises $TiO_2$.

7. The filter of claim 1, wherein the second material is selected from $SiO_2$, SiO, $MgF_2$, $In_2O_3$, ITO (Sn-doped $In_2O_3$), a polymers such as polymethyl methacrylate (PMMA), and any combination thereof.

8. The filter of claim 1, wherein the second material comprises $SiO_2$.

9. The filter of claim 1, wherein the Bragg grating comprises at least 30 layers.

10. A lens, the lens comprising:
  a) a substrate, the substrate having an outer and inner surface;
  b) the optical filter of claim 1, the filter having an outer and inner surface; and
  c) a coating, the coating having an outer and inner surface.

11. The lens of claim 10, wherein the coating is chosen from an antireflective coating or a tint.

12. The lens of claim 10, wherein the coating comprises an antireflective coating and a tint.

13. The lens of claim 10, wherein the coating reduces reflectance of the filter.

14. A method of making the optical filter of claim 1, comprising the steps of:
  (a) contacting one or more pellets of the first material with an electron beam under vacuum to evaporate particles of the first material;
  (b) contacting one or more pellets of the second material with an electron beam under vacuum to evaporate particles of the second material; and
  (c) depositing the particles of the first material and the particles of the second material onto a substrate, thereby forming the optical filter;
  wherein steps (a) and (b) occur sequentially.

15. A transition optical filter, wherein the filter comprises a Bragg grating; the Bragg grating comprises alternating layers of a first material having a first index of refraction and a second material having a second index of refraction, wherein the first index of refraction is higher than the second index of refraction; and the filter reflects substantially all light with a wavelength below 560 nm, transmits substantially all light with a wavelength above 570 nm, and is activated by low wavelength light with a wavelength between 466 and 470 nm.

16. The filter of claim 7, wherein the second material is a polymer; and the polymer is polymethyl methacrylate (PMMA).

17. The filter of claim 3, wherein the first material is selected from $TiO_2$, $Ti_3O_5$, $TiO_x$, $Al_2O_3$, $AlO_x$, C (diamond), SiC, $SrTiO_3$, $Ta_2O_5$, $ZrO_2$, ZnS, ZnO, and any combination thereof.

18. The filter of claim 3, wherein the second material is selected from $SiO_2$, SiO, $MgF_2$, $In_2O_3$, ITO (Sn-doped $In_2O_3$), a polymer, and any combination thereof.

19. The filter of claim 15, wherein the first material is selected from $TiO_2$, $Ti_3O_5$, $TiO_x$, $Al_2O_3$, $AlO_x$, C (diamond), SiC, $SrTiO_3$, $Ta_2O_5$, $ZrO_2$, ZnS, ZnO, and any combination thereof.

20. The filter of claim 15, wherein the second material is selected from $SiO_2$, SiO, $MgF_2$, $In_2O_3$, ITO (Sn-doped $In_2O_3$), a polymer, and any combination thereof.

* * * * *